(12) United States Patent
Ma et al.

(10) Patent No.: US 11,966,844 B2
(45) Date of Patent: Apr. 23, 2024

(54) METHOD FOR TRAINING NEURAL NETWORK MODEL AND APPARATUS

(71) Applicant: HUAWEI TECHNOLOGIES CO., LTD., Guangdong (CN)

(72) Inventors: Tao Ma, Shanghai (CN); Qing Su, Shenzhen (CN); Ying Jin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/981,120

(22) Filed: Nov. 4, 2022

(65) Prior Publication Data
US 2023/0072438 A1 Mar. 9, 2023

Related U.S. Application Data

(63) Continuation of application No. 16/910,289, filed on Jun. 24, 2020, now Pat. No. 11,521,012, which is a
(Continued)

(30) Foreign Application Priority Data

Dec. 29, 2017 (CN) .......................... 201711488995.0

(51) Int. Cl.
G06N 3/08 (2023.01)
G06F 7/14 (2006.01)
(Continued)

(52) U.S. Cl.
CPC ................ G06N 3/08 (2013.01); G06F 7/14 (2013.01); G06F 8/71 (2013.01); G06F 18/214 (2023.01);
(Continued)

(58) Field of Classification Search
CPC ............ G06N 3/045; G06N 3/08; G06N 5/04; G06N 3/048; G06N 3/082; G06N 3/044;
(Continued)

(56) References Cited

U.S. PATENT DOCUMENTS 9,390,370 B2 7/2016 Kingsbury
9,466,021 B1 10/2016 Chen et al.
(Continued)

FOREIGN PATENT DOCUMENTS

CN 104866868 A 8/2015
CN 105453171 A 3/2016
(Continued)

OTHER PUBLICATIONS

Chen et al., "Convolutinal Neural Networks for Automated Annotation of Cellular Cryo-Electron Tomograms," Oct. 2017, 13 pages.
(Continued)

Primary Examiner — Tuan A Vu
(74) Attorney, Agent, or Firm — Fish & Richardson P.C.

(57) ABSTRACT

This application provides a method for training a neural network model and an apparatus. The method includes: obtaining annotation data that is of a service and that is generated by a terminal device in a specified period; training a second neural network model by using the annotation data that is of the service and that is generated in the specified period, to obtain a trained second neural network model; and updating a first neural network model based on the trained second neural network model. In the method, training is performed based on the annotation data generated by the terminal device, so that in an updated first neural network model compared with a universal model, an inference result has a higher confidence level, and a personalized requirement of a user can be better met.

18 Claims, 8 Drawing Sheets

Related U.S. Application Data continuation of application No. PCT/CN2018/116533, filed on Nov. 20, 2018.

(51) Int. Cl.
| | | |
|---|---|---|
| *G06F 8/71* | (2018.01) | |
| *G06F 18/214* | (2023.01) | |
| *G06F 18/22* | (2023.01) | |
| *G06N 3/044* | (2023.01) | |
| *G06N 3/045* | (2023.01) | |
| *G06N 3/082* | (2023.01) | |
| *G06N 5/04* | (2023.01) | |
| *G06Q 40/00* | (2023.01) | |
| *G06V 20/58* | (2022.01) | |

(52) U.S. Cl.
CPC ............. *G06F 18/22* (2023.01); *G06N 3/044* (2023.01); *G06N 3/045* (2023.01); *G06N 3/082* (2013.01); *G06N 5/04* (2013.01); *G06Q 40/00* (2013.01); *G06V 20/58* (2022.01)

(58) Field of Classification Search
CPC .......... G06F 18/22; G06F 18/214; G06F 8/71; G06Q 10/0635; G06Q 40/00; G16H 40/67; H04W 12/128; G06V 40/103
See application file for complete search history.

(56) References Cited

U.S. PATENT DOCUMENTS

| | | | |
|---|---|---|---|
| 2012/0263376 | A1 | 10/2012 | Wang et al. |
| 2016/0358068 | A1* | 12/2016 | Brothers ................. G06N 3/082 |
| 2016/0358070 | A1 | 12/2016 | Brothers et al. |
| 2017/0011077 | A1* | 1/2017 | Kypreos ................. G06Q 40/00 |
| 2017/0189641 | A1* | 7/2017 | Moturu ................... G16H 40/67 |
| 2017/0262750 | A1* | 9/2017 | Kozuka ................. G06V 40/103 |
| 2017/0270621 | A1* | 9/2017 | Fleming ............. G06Q 10/0635 |
| 2018/0025157 | A1* | 1/2018 | Titonis ................. H04W 12/128 726/22 |
| 2018/0089591 | A1* | 3/2018 | Zeiler ...................... G06F 3/048 |
| 2018/0365556 | A1 | 12/2018 | Guttmann |
| 2019/0184561 | A1* | 6/2019 | Yip ......................... G06N 3/044 |
| 2019/0258251 | A1 | 8/2019 | Ditty |

FOREIGN PATENT DOCUMENTS

| | | |
|---|---|---|
| CN | 105550295 A | 5/2016 |
| CN | 106055844 A | 10/2016 |
| CN | 106156077 A | 11/2016 |
| CN | 106326939 A | 1/2017 |
| CN | 106529568 A | 3/2017 |
| CN | 106610854 A | 5/2017 |
| CN | 106650928 A | 5/2017 |
| CN | 106709565 A | 5/2017 |
| CN | 106777402 A | 5/2017 |
| CN | 106778867 A | 5/2017 |
| CN | 106796668 A | 5/2017 |
| CN | 106897746 A | 6/2017 |
| CN | 107103362 A | 8/2017 |
| CN | 107133436 A | 9/2017 |
| CN | 107330522 A | 11/2017 |
| CN | 107368892 A | 11/2017 |
| CN | 107491790 A | 12/2017 |
| WO | 2017213857 A1 | 12/2017 |
| WO | 2017223211 A1 | 12/2017 |

OTHER PUBLICATIONS

Ohno et al., "Method for Predicting Quality or Manufacturing Condition of Cement," CN 104350021, Mar. 1, 2017, 30 pages (translation).

Yang et al., "Voice Marking Method and Device," CN 105374350, May 17, 2017, 14 pages (translation).

International Search Report dated Jan. 31, 2019, issued in counterpart application No. PCT/CN2018/116533, with English translation, 19 pages.

Extended Search Report dated Dec. 15, 2020, issued in counterpart EP Application No. 18896605.5, 8 pages.

Itay Hubara et al., "Quantized Neural Networks Training Neural Networks with Low Precision Weights and Activations," arXiv:1609.07061v1 [cs.NE], Sep. 22, 2016, 29 pages.

McMahan et al., "Communication-Efficient Learning of Deep Networks from Decentralized Data," aXiv:1602.05629v3 [cs.LG] Feb. 28, 2017, 11 pages.

Office Action dated Aug. 20, 2020, issued in counterpart Chinese Application No. 201711488995.0, with English Translation, 13 Pages.

EP Communication Pursuant to Article 94(3) EPC in European Appln No. 18896605.5, dated Dec. 22, 2022, 5 pages.

\* cited by examiner

METHOD FOR TRAINING NEURAL NETWORK MODEL AND APPARATUS

CROSS-REFERENCE TO RELATED APPLICATIONS

This application is a continuation of U.S. patent application Ser. No. 16/910,289, filed on Jun. 24, 2020, which is a continuation of International Application No. PCT/CN2018/116533, filed on Nov. 20, 2018. The International Application claims priority to Chinese Patent Application No. 201711488995.0, filed on Dec. 29, 2017. All of the aforementioned patent applications are hereby incorporated by reference in their entireties.

TECHNICAL FIELD

The present invention relates to the field of computer technologies, and in particular, to a method for training a neural network model and an apparatus.

BACKGROUND

Artificial intelligence (AI) is a new technical science that studies and develops a theory, a method, a technology, and an application system for simulating, extending, and expanding human intelligence. The artificial intelligence is a branch of computer science, and attempts to understand essence of intelligence and produce a new intelligent machine that can perform reaction in a manner similar to human intelligence. Research in this field includes robotics, speech recognition, image recognition, natural language processing, expert systems, and the like. A neural network model based on the artificial intelligence is a machine learning model that simulates a brain structure. In a machine learning field, a neural network is usually used to establish a model for a relatively complex task. A scale, including a depth and a width, of the neural network can be adjusted depending on an application field and a problem scale. Due to a strong expression capability of the neural network, the neural network is widely applied in application fields such as speech recognition, image recognition, natural language processing, and advertisement push.

A structure of the neural network model includes a plurality of layers. A first layer is an input layer, a top layer is an output layer, and there are zero or a plurality of hidden layers in the middle. Each layer includes one or more nodes. A scale of the input layer is determined based on a quantity of input variables, and a scale of the output layer depends on a quantity of categories. The hidden layer includes a plurality of neurons, and complexity and an expression capability of the neural network model can be adjusted by adjusting the quantity of neurons. Usually, a wider and deeper neural network indicates a stronger modeling capability of the neural network, but also indicates higher costs of training the model. A process of training the neural network model is to adjust parameter values in the neural network in an iterative manner based on input and output of a training sample until convergence, and is also referred to as a learning process of the neural network.

In actual application of the neural network model, a complex neural network model is usually trained on cloud, to meet a preset precision requirement, for example, a 32-bit single precision floating point (FP32). Then, after precision, memory, real-time quality, power consumption, and the like are optimized based on a requirement of a feature of a terminal device, an offline neural network model that can be independently run on a terminal device side is generated. However, the offline neural network model generated in the manner for training a neural network model on cloud is a universal model, and usually cannot meet a personalized requirement of a user.

SUMMARY

Embodiments of this application provide a method for training a neural network model, to resolve a prior-art technical problem that an offline neural network model generated in a manner for training a neural network model on cloud is a universal model, and cannot meet a personalized requirement of a user.

According to a first aspect, an embodiment of this application provides a method for training a neural network model. The method is applied to a terminal device, the terminal device includes a first neural network model and a second neural network model that are used to process a service, and precision of the first neural network model is lower than precision of the second neural network model. The method includes:
  obtaining annotation data that is of the service and that is generated by the terminal device in a specified period;
  training the second neural network model by using the annotation data that is of the service and that is generated in the specified period, to obtain a trained second neural network model; and
  updating the first neural network model based on the trained second neural network model.

It can be learned from the foregoing content that the second neural network model with relatively high precision is updated based on the annotation data that is of the service and that is generated by the terminal device in the specified period, to further update the first neural network model. Because the second neural network model has relatively high precision, the second neural network model is first trained, and the first neural network model is updated based on the trained second neural network model, so that a training effect can be more obvious and effective. In addition, training is performed based on the annotation data generated by the terminal device, so that in an updated first neural network model compared with a universal model, an inference result has a higher confidence level, and a personalized requirement of a user can be better met.

In a possible design, after the trained second neural network model is obtained, before the updating the first neural network model, the method further includes:
  if it is determined that the trained second neural network model is an initial update of a second neural network model corresponding to a first version, storing the first neural network model; and
  after the updating the first neural network model, the method further includes:
  receiving a second version software package sent by a cloud server, where the second version software package includes a first neural network model corresponding to a second version; and
  if it is determined that the first neural network model corresponding to the second version is different from the stored first neural network model, updating the first neural network model corresponding to the second version.

In this way, in this embodiment of this application, after the second version is received, the first neural network model corresponding to the second version is compared with a first neural network model corresponding to the first version, to determine whether to use the second version. Therefore, a quantity of upgrade times can be effectively reduced, processing load can be reduced, and it can be ensured that the model meets a personalized requirement of a user.

In a possible design, the updating the first neural network model corresponding to the second version includes:
  obtaining annotation data that is of the service and that is generated in a plurality of historical specified periods;
  training, by using the annotation data that is of the service and that is generated in the plurality of historical specified periods, a second neural network model corresponding to the second version, to obtain a trained second neural network model corresponding to the second version; and
  updating, based on the trained second neural network model corresponding to the second version, the first neural network model corresponding to the second version.

In a possible design, the terminal device generates the annotation data of the service in the specified period in the following manner:
  performing online inference on first input data of the service in the specified period by using the first neural network model, to obtain an online inference result; and
  if a valid feedback of a user for the online inference result is received, generating the annotation data of the service based on the first input data and the valid feedback of the user for the online inference result; or if no valid feedback of a user for the online inference result is received, after it is determined that a confidence level of the online inference result is greater than a first threshold, generating the annotation data of the service based on the first input data and the online inference result.

In a possible design, the terminal device generates the annotation data of the service in the specified period in the following manner:
  performing offline inference on second input data of the service in the specified period by using a third neural network model, to obtain an offline inference result, where precision of the third neural network model is higher than the precision of the second neural network model, or the third neural network model is the second neural network model; and
  if it is determined that a confidence level of the offline inference result is greater than a second threshold, generating the annotation data of the service based on the second input data and the offline inference result.

In a possible design, the training the second neural network model by using the annotation data that is of the service and that is generated in the specified period includes:
  when the terminal device is in a charging state, training the second neural network model by using the annotation data that is of the service and that is generated in the specified period.

According to a second aspect, an embodiment of this application provides a terminal device. The terminal device includes a first neural network model and a second neural network model that are used to process a service, and precision of the first neural network model is lower than precision of the second neural network model. The terminal device further includes:
  an obtaining module, configured to obtain annotation data that is of the service and that is generated by the terminal device in a specified period; and
  a processing module, configured to: train the second neural network model by using the annotation data that is of the service and that is generated in the specified period, to obtain a trained second neural network model; and update the first neural network model based on the trained second neural network model.

In a possible design, after obtaining the trained second neural network model and before updating the first neural network model, the processing module is further configured to:
  if it is determined that the trained second neural network model is an initial update of a second neural network model corresponding to a first version, store the first neural network model;
  the terminal device further includes a transceiver module, the transceiver module is configured to receive a second version software package sent by a cloud server, and the second version software package includes a first neural network model corresponding to a second version; and
  the processing module is further configured to: if it is determined that the first neural network model corresponding to the second version is different from the stored first neural network model, update the first neural network model corresponding to the second version.

In a possible design, the processing module is specifically configured to:
  obtain annotation data that is of the service and that is generated in a plurality of historical specified periods;
  train, by using the annotation data that is of the service and that is generated in the plurality of historical specified periods, a second neural network model corresponding to the second version, to obtain a trained second neural network model corresponding to the second version; and
  update, based on the trained second neural network model corresponding to the second version, the first neural network model corresponding to the second version.

In a possible design, the processing module is further configured to: perform online inference on first input data of the service in the specified period by using the first neural network model, to obtain an online inference result; and
  if the transceiver module receives a valid feedback of a user for the online inference result, generate the annotation data of the service based on the first input data and the valid feedback of the user for the online inference result; or if the transceiver module receives no valid feedback of a user for the online inference result, after it is determined that a confidence level of the online inference result is greater than a first threshold, generate the annotation data of the service based on the first input data and the online inference result.

In a possible design, the processing module is further configured to:
  perform offline inference on second input data of the service in the specified period by using a third neural network model, to obtain an offline inference result, where precision of the third neural network model is higher than the precision of the second neural network model, or the third neural network model is the second neural network model; and
  if it is determined that a confidence level of the offline inference result is greater than a second threshold, generate the annotation data of the service based on the second input data and the offline inference result.

In a possible design, the processing module is specifically configured to:

when the terminal device is in a charging state, train the second neural network model by using the annotation data that is of the service and that is generated in the specified period.

An embodiment of this application further provides a computer storage medium. The storage medium stores a software program. When the software program is read and executed by one or more processors, the method for training a neural network model in the foregoing aspects or the possible designs can be implemented.

An embodiment of this application further provides a computer program product including an instruction. When the computer program product is run on a computer, the computer is enabled to perform the method for training a neural network model in the foregoing aspects or the possible designs.

An embodiment of this application further provides a computer program. When the computer program is run on a computer, the computer is enabled to perform the method for training a neural network model in the foregoing aspects or the possible designs.

An embodiment of this application further provides a terminal device. The terminal device includes: a memory, configured to store a software program; and a processor, configured to: read the software program in the memory, and perform the method for training a neural network model in the foregoing aspects or the possible designs.

DESCRIPTION OF EMBODIMENTS

The following describes this application in detail with reference to the accompanying drawings of this specification, and a specific operation method in a method embodiment may also be applied to an apparatus embodiment or a system embodiment. In the descriptions of this application, unless otherwise specified, "a plurality of" indicates two or more than two.

Figure 1A:
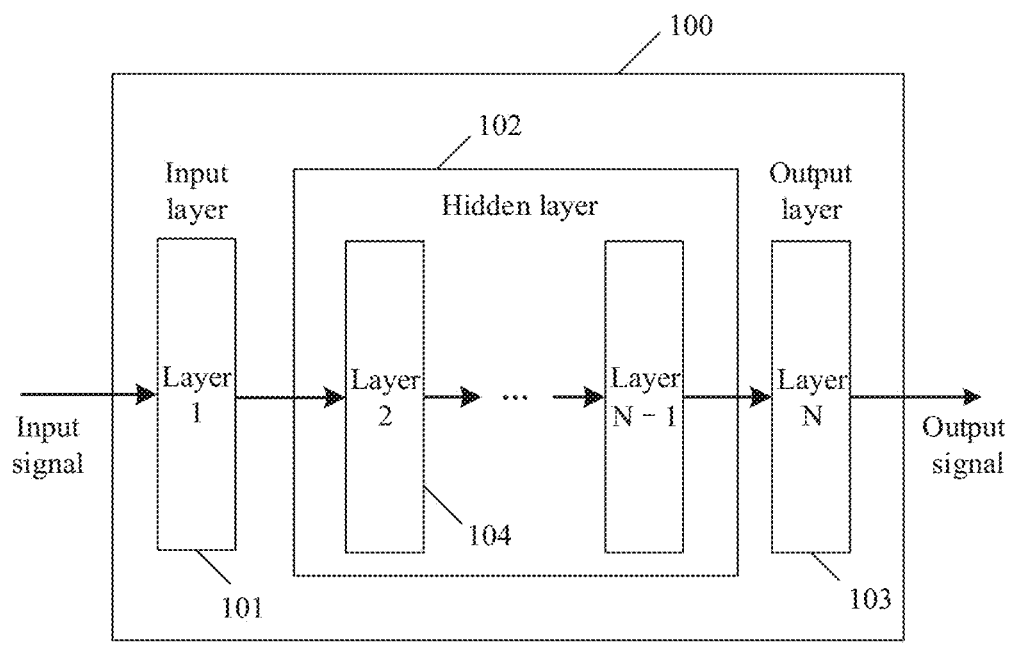
FIG. 1a is a schematic structural diagram of a neural network model.

FIG. 1a is a schematic structural diagram of a neural network model. The neural network model 100 has N processing layers. N≥3 and N is a natural number. A first layer of the neural network model is an input layer 101, and is responsible for receiving an input signal. A last layer of the neural network model is an output layer 103 for outputting a processing result of the neural network model. Layers other than the first layer and the last layer are intermediate layers 104. These intermediate layers jointly form a hidden layer 102. Each intermediate layer in the hidden layer can receive an input signal, and output a signal. The hidden layer is responsible for a process of processing the input signal. Each layer represents a logical level of signal processing. Through a plurality of layers, a data signal may be processed by using multi-level logic.

Figure 1B:
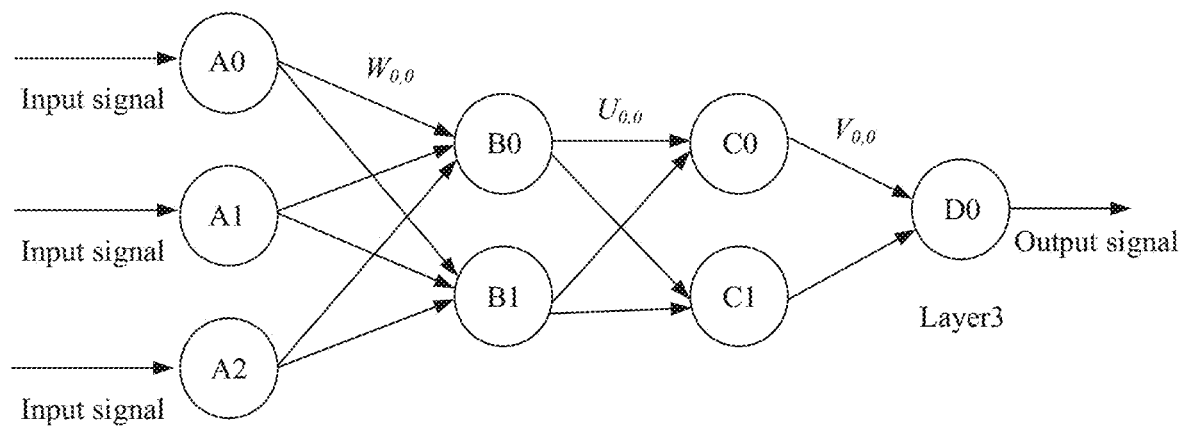
FIG. 1b is an example diagram of a neural network model.

The following uses an example to describe a process of training the neural network model. FIG. 1b shows a relatively simple neural network model. The neural network model includes an input layer, two hidden layers, and an output layer. The input layer has three nodes: a node A0, a node A1, and a node A2. A first hidden layer includes two nodes: a node B0 and a node B1. A second hidden layer includes two nodes: a node C0 and a node C1. The output layer includes one node D0.

In the neural network model, a line segment connecting nodes at different layers is referred to as an edge. Each edge has a corresponding edge weight. The edge weight indicates a contribution of a node that is in two nodes connected by the corresponding edge and that is close to the input layer to a node that is in the two nodes connected by the corresponding edge and that is away from the input layer. Specifically, in FIG. 1b, $W_{0,0}$ indicates an edge weight from the node A0 at the input layer to the node B0 at the first hidden layer. $U_{0,0}$ indicates an edge weight from the node B0 at the first hidden layer to the node C0 at the second hidden layer. $V_{0,0}$ indicates an edge weight from the node C0 at the second hidden layer to the node DO at the output layer. An edge weight of each edge in the neural network model may also be referred to as a parameter value of the neural network model, and precision (or may be referred to as precision of the neural network model) of the parameter value of the neural network model may be FP32, FP16, or other precision. This is not specifically limited.

A process of training the neural network model in FIG. 1b is as follows:

Step 1: Randomly extract a training sample from a set of all training samples. The training sample includes all input features, and the input features may be values from 0 to 1 (including 0 and 1), or may be floating point numbers. Each training sample has an expected output value.

Step 2: Perform forward calculation on the first hidden layer. In the forward calculation, edge weights of all incoming edges of the hidden layer and an activation value of a lower-layer node need to be used. The incoming edge herein is an edge from the lower-layer node to a node at a current layer. Correspondingly, an outgoing edge is an edge from the node at the current layer to a higher-layer node. Herein, a specific layer in the neural network model is used as a reference, a layer close to the input layer is referred to as a lower layer, and a layer far away from the input layer is referred to as a higher layer.

Step 3: Similarly, perform forward calculation on the second hidden layer.

Step 4: When the output layer includes only one node D0, calculate an activation value and a residual value of the node D0. The residual value represents a difference between an observed value and a predicted value. A residual value ED0 of the node D0 may be calculated based on the expected output value of the training sample and the calculated activation value of the node D0.

Step 5: Perform inverse calculation on the second hidden layer, calculate a residual value of each node at the hidden layer based on the residual value of the output layer and an edge weight of an outgoing edge at the second hidden layer, and adjust an edge weight of a corresponding outgoing edge.

Specifically, when a residual value of the node C0 is calculated, because the output layer has only one node D0, the residual value ED0 of the node D0 is multiplied by an edge weight $V_{0,0}$ of an outgoing edge of the node C0 to obtain a value, and then the value is substituted into a residual calculation function, to obtain the residual value EC of the node C0.

Similarly, a residual value EC1 of the node C1 is calculated.

When the edge weight is adjusted, an intermediate parameter is subtracted from a current edge weight, to obtain an updated edge weight. A preset step length is multiplied by a residual value of a higher-layer node of an edge corresponding to the edge weight, and an obtained product is multiplied by an activation value of a lower-layer node of the edge, to obtain the intermediate parameter. Specifically, when the edge weight $V_{0,0}$ is adjusted based on the preset step length, the intermediate parameter is subtracted from the edge weight $V_{0,0}$. To obtain the intermediate parameter, the preset step length is multiplied by the residual value of the node D0, and an obtained product is multiplied by an activation value ACTC0 of the node C0. In other words, $V_{0,0}=V_{0,0}-L \times ED0 \times ACTC0$. L represents the preset step length. Similarly, an edge weight $V_{1,0}$ is adjusted.

Step 6: Similarly, perform inverse calculation on the first hidden layer, calculate a residual value of each node at the hidden layer based on a residual value of each node at the second hidden layer and an edge weight of an outgoing edge at the first hidden layer, and adjust an edge weight of a corresponding outgoing edge.

Specifically, when a residual value of the node B0 is calculated, the residual value of the node C0 is multiplied by an edge weight $U_{0,0}$ of an outgoing edge of the node B0 corresponding to the node C0, the residual value of the node C1 is multiplied by an edge weight $U_{0,1}$ of an outgoing edge of the node B1 corresponding to the node C1, two products are summed, in other words, $EC0 \times U_{0,0}+EC1 \times U_{0,1}$, and the sum is substituted into the residual calculation function to obtain a residual value EB0 of the node B0. Similarly, a residual value EB1 of the node B1 is calculated.

Step 7: Perform inverse calculation on the input layer, and adjust an edge weight of an edge from the input layer to the first hidden layer.

Step 8. Return to step 1 to train a next training sample.

After all the training samples are processed according to step 1 to step 8, training of the neural network model is completed.

FIG. 1b shows only a very simple neural network model. In actual application, the neural network model has a very large width. In addition, to achieve a better classification effect, the neural network model usually has a relatively large depth, and there are also a large quantity of training samples. In this case, calculation pressure is extremely high. Therefore, in the prior art, after a complex neural network model is trained on cloud to obtain a high-precision neural network model (for example, the precision is FP32), the high-precision neural network model is usually first converted into a low-precision neural network model (for example, the precision is FP16) based on a data format of TensorFlow/MxNet/Caffe or based on another standard data format. Then, the low-precision neural network model is converted into an offline neural network model, and the offline neural network model can run independently without using a deep learning framework (for example, TensorFlow/MxNet/Caffe), and has better performance. Subsequently, the offline neural network model is deployed on a terminal device for running, to perform an inference service.

Because the neural network model trained on cloud is a universal model, the offline neural network model obtained by converting the neural network model trained on cloud is also a universal model. Consequently, a personalized requirement of a user may not be met. For example, in a commercial release version, recognition performance of a neural network model used to perform speech recognition is 95%, and a terminal device a performs speech recognition by using the neural network model. In an example, if a user of the terminal device a has a relatively strong accent (for example, mandarin with a Hunan accent), recognition performance of performing speech recognition by the terminal device a by using the neural network model may be only 88%. In another example, if a user enables a speech recognition service in some special scenarios (for example, a vehicular scenario), recognition performance of performing speech recognition by the terminal device a by using the neural network model may be only 85%. It can be learned that the personalized requirement of the user is not considered in the universal offline neural network model, and an effect in actual use may be unsatisfactory. This causes relatively poor user experience.

Based on this, an embodiment of this application provides a method for training a neural network model, to resolve a prior-art technical problem that an offline neural network model generated in a manner for training a neural network model on cloud is a universal model, and cannot meet a personalized requirement of a user.

Figure 2:
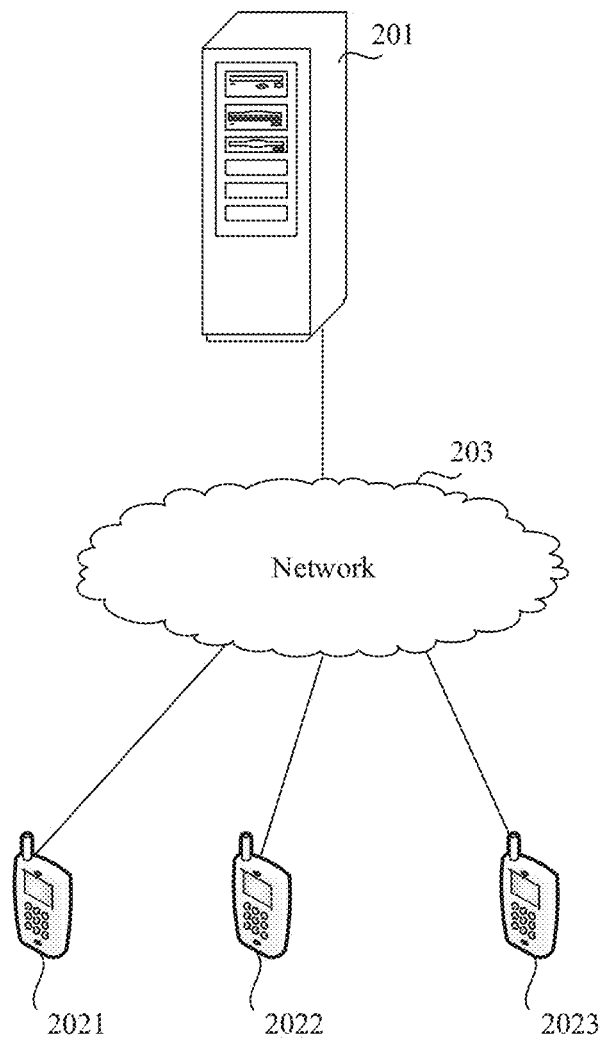
FIG. 2 is a schematic diagram of a system architecture to which an embodiment of this application is applicable.

FIG. 2 is a schematic diagram of a system architecture to which an embodiment of this application is applicable. As shown in FIG. 2, the system architecture may include a cloud server 201, a network 203, and one or more terminal devices, for example, a first terminal device 2021, a second terminal device 2022, and a third terminal device 2023. The network 203 is used to provide a medium of a communication link between the cloud server 201 and the first terminal device 2021, the second terminal device 2022, and the third terminal device 2023. The network 203 may include various connection types, such as a wired communication link, a wireless communication link, or a fiber optic cable.

Specifically, the cloud server 201 may train a plurality of neural network models for different services, for example, a neural network model used for speech recognition, and a neural network model used for image recognition. The neural network model $S_{cloud}$ used for image recognition is used as an example. After completing training, the cloud server 201 may first simplify the neural network model $S_{cloud}$ (which has relatively high precision, for example, FP32), for example, reduce a quantity of hidden layers, and then convert the neural network model $S_{cloud}$ into a neural network model $S_c$. The neural network model $S_c$ is used to perform update through training. During training, fine adjustment is performed on a parameter value of the neural network model $S_c$, and a precision requirement is relatively high. Therefore, precision of the neural network model $S_c$ may be FP32. Further, the neural network model $S_c$ is converted by using an offline tool to generate a neural network model $S_t$ that can be deployed on the terminal device. The neural network model $S_t$ is used to perform online inference. For the online inference, a time requirement is relatively high, but a precision requirement is not high. Therefore, precision of the neural network model $S_t$ may be lower than the precision of the neural network model $S_c$, but a network structure of the neural network model $S_c$ may be the same as a network structure of the neural network model $S_t$. The cloud server 201 may send the neural network model $S_c$ and the neural network model $S_t$ to the terminal device. In this way, the neural network model $S_c$ and the neural network model $S_t$ may be installed on the terminal device. Because the neural network model $S_t$ has a simplified structure and relatively low precision, an inference speed is relatively high, and the terminal device may perform online inference by using the neural network model $S_t$. For some offline data that has no time requirement, the terminal device may use the neural network model $S_c$ with relatively high precision to perform inference. Further, to effectively ensure offline data inference accuracy, the cloud server 201 in this embodiment of this application may further generate a neural network model $S_i$ with high precision. The neural network model $S_i$ may be a model (which may be an integrated model using a plurality of technologies) with relatively high complexity, and have a relatively high recognition rate and relatively high precision (have better performance than the neural network model $S_{cloud}$). In this way, after the cloud server 201 sends the neural network model $S_i$ to the terminal device, the terminal device may use the neural network model $S_i$ to perform offline data inference.

In other words, the terminal device may include the neural network model $S_c$ and the neural network model $S_t$. The neural network model $S_t$ is used to perform online inference, and the neural network model $S_c$ is used to perform oline inference. Alternatively, the terminal device may include the neural network model $S_c$, the neural network model $S_t$, and the neural network model $S_i$. The neural network model $S_t$ is used to perform online inference, and the neural network model $S_i$ is used to perform offline inference.

It can be learned from the foregoing content that in this embodiment of this application, the cloud server 201 converts the neural network model $S_{cloud}$ into the neural network model $S_c$, and the terminal device stores the neural network model $S_c$, to facilitate subsequent incremental training on a terminal device side.

The cloud server 201 may further upgrade a trained neural network model, and sends an upgrade software package to the terminal device. The upgrade software package may include an upgraded neural network model $S_c$ and an upgraded neural network model $S_t$. In this way, the terminal device may upgrade the stored neural network model $S_c$ and the stored neural network model $S_t$.

The terminal device is a device that has a wireless transceiver function, may be deployed on land, and includes an indoor device, an outdoor device, a handheld device, or a vehicle-mounted device. Alternatively, the terminal device may be deployed on water (for example, on a steamship), or may be deployed in the air (for example, on a plane, a balloon, or a satellite). The terminal device may be a mobile phone, a tablet computer, a computer with a wireless transceiver function, a virtual reality (VR) terminal device, an augmented reality (AR) terminal device, a wireless terminal device in industrial control, a wireless terminal device in self driving, a wireless terminal device in telemedicine, a wireless terminal device in a smart grid, a wireless terminal device in transportation safety, a wireless terminal device in a smart city, a wireless terminal device in a smart home, or the like, or may be a hardware device such as a chip in the device listed above.

Figure 3:
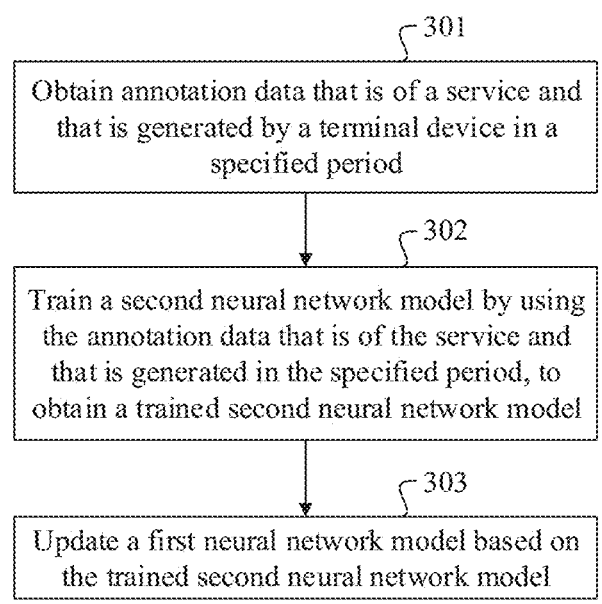
FIG. 3 is a schematic flowchart corresponding to a method for training a neural network model according to an embodiment of this application.

Based on the system architecture shown in FIG. 2, FIG. 3 is a schematic flowchart corresponding to a method for training a neural network model according to an embodiment of this application. The method may be applied to a terminal device. A first neural network model and a second neural network model that are used to process a service are installed on the terminal device, and precision of the first neural network model is lower than precision of the second neural network model. As shown in FIG. 3, the method includes the following steps.

Step 301: Obtain annotation data that is of the service and that is generated by the terminal device in a specified period.

Herein, a time length of the specified period may be set based on an actual requirement, for example, may be set to 10 days. The service may be any one of a plurality of services that can be implemented by the terminal device, for example, a speech recognition service or an image recognition service.

Step 302. Train the second neural network model by using the annotation data that is of the service and that is generated in the specified period, to obtain a trained second neural network model.

Herein, when the model is trained, fine adjustment is performed on a parameter value of the model. Therefore, a precision requirement is high. Considering that the precision of the first neural network model is relatively low, if the first neural network model is directly trained by using the annotation data that is of the service and that is generated in the specified period, a training effect may be unobvious. Therefore, in this embodiment of this application, the terminal device stores the second neural network model with relatively high precision, and trains the second neural network model by using the annotation data that is of the service and that is generated in the specified period, so that a training effect is more obvious and effective. The training of the second neural network model may be incremental training. For specific implementation, refer to the prior art. Details are not described herein.

Step 303. Update the first neural network model based on the trained second neural network model.

Herein, because a parameter value of the second neural network model is changed through training in step 302, the updating the first neural network model based on the trained second neural network model may be specifically: updating a parameter value of the first neural network model based on the parameter value of the trained second neural network model. In specific implementation, the first neural network model (the parameter value is updated) suitable to be used on the terminal device may be generated by converting the trained second neural network model by using an offline model conversion tool.

It can be learned from the foregoing content that the second neural network model with relatively high precision is updated based on the annotation data that is of the service and that is generated by the terminal device in the specified period, to further update the first neural network model. Because the second neural network model has relatively high precision, the second neural network model is first trained, and the first neural network model is updated based on the trained second neural network model, so that a training effect can be more obvious and effective. In addition, training is performed based on the annotation data generated by the terminal device, so that in an updated first neural network model compared with a universal model, an inference result has a higher confidence level, and a personalized requirement of a user can be better met.

In specific implementation, after authorization of a user is applied for and obtained, the annotation data that is of the service and that is generated by the terminal device in the specified period may be obtained. The annotation data includes input data and a label (for example, may be obtained through inference) of the input data. For example, a to-be-recognized picture is input, and a label "cat" of the to-be-recognized picture is obtained through inference. In this case, the to-be-recognized picture and the label "cat" are a group of annotation data. Non-annotation data is input data without a label, for example, input data that is not inferred, or input data that is inferred but obtains no label. This is not specifically limited.

The annotation data of the service may be generated in a plurality of manners, for example, generated through online inference, generated through offline inference, or generated through reinforcement learning.

That the annotation data of the service is generated through the online inference is specifically as follows: In a service running process, input data is inferred by using the first neural network model, and a corresponding confidence level is output. An inference result whose confidence level is greater than a first threshold is selected as an input data annotation result, to obtain the annotation data. The inference result may include a plurality of results, which are sorted based on recognition rates. For example, a recognition rate of a1 is 80%, a recognition rate of a2 is 10%, . . . , and a recognition rate of an is 1%. A sum of the recognition rates is 1. Determining whether the confidence level of the inference result is greater than the first threshold may be specifically: determining whether a highest (TOP 1) recognition rate (namely, the recognition rate of a1) in the inference results is greater than the first threshold. If the recognition rate is greater than the first threshold, a1 in the inference results may be used as the label of the input data, to obtain the annotation data. The first threshold may be set based on an actual requirement, and may be constantly adjusted, to ensure that annotation data with high quality is continuously collected and obtained.

For example, when speech recognition is currently performed, if a confidence level of speech recognition of "enabling Wi-Fi" is 92% (a current first threshold is 90%), corresponding original input data and an inference result are stored.

In this embodiment of this application, annotation data generated through the online inference may be continuously collected and accumulated, to facilitate subsequent training of a neural network model. Further, to ensure data security, the obtained annotation data may be stored in an encryption manner. It should be noted that the foregoing online inference manner is mainly applicable to a relatively simple inference service with relatively low power consumption, for example, a speech recognition service.

That the annotation data of the service is generated through the offline inference is specifically as follows: Input data of the service is collected, and offline data annotation processing is started at a specific moment, or when the terminal device is charged, offline data annotation processing is run as a background service. The specific moment may be an idle moment (an electric quantity is higher than an electric quantity threshold, and the electric quantity threshold may be set based on an actual situation). The offline data annotation processing may specifically refer to using a third neural network model to perform inference processing on the input data, and outputting a corresponding confidence level; and selecting an inference result whose confidence level is greater than a second threshold as an input data annotation result, to obtain the annotation data. The second threshold may be set based on an actual requirement, and may be constantly adjusted, to ensure that annotation data with high quality is continuously collected and obtained.

For example, when image recognition is currently performed, an input image may be stored, for example, a batch of pictures such as a cat and blue sky in a complex scenario. When the user performs charging, the third neural network model is used to infer the current batch of data. If a confidence level of an inference result is 95% (a current second threshold is 93%), annotation data is obtained based on the original data and the inference result.

In this embodiment of this application, annotation data generated through the offline inference may be continuously collected and accumulated, to facilitate subsequent training of a neural network model. Further, to ensure data security, the obtained annotation data may be stored in an encryption manner. It should be noted that the foregoing offline inference manner is mainly applicable to a relatively complex inference service (a required time may be relatively long), for example, an image recognition service or natural language processing (NLP).

That the annotation data of the service is generated through the reinforcement learning is specifically as follows: During inference service processing, if the user performs obvious intervention and modification on a result (a feedback from the user is received), it is considered that the current intervention of the user is to annotate the data, and a modification result of the user is used as a data annotation result, to obtain the annotation data.

For example, when speech recognition is performed, if the user modifies an inference result of the current speech recognition, this modification may be used as data annotation processing. For another example, during image recognition or language understanding, if the user manually names a to-be-recognized image, this naming may be used as data annotation processing.

It should be noted that the foregoing reinforcement learning manner is mainly applicable to a relatively complex inference service (a required time may be relatively long), for example, an image recognition service or natural language processing.

Figure 4:
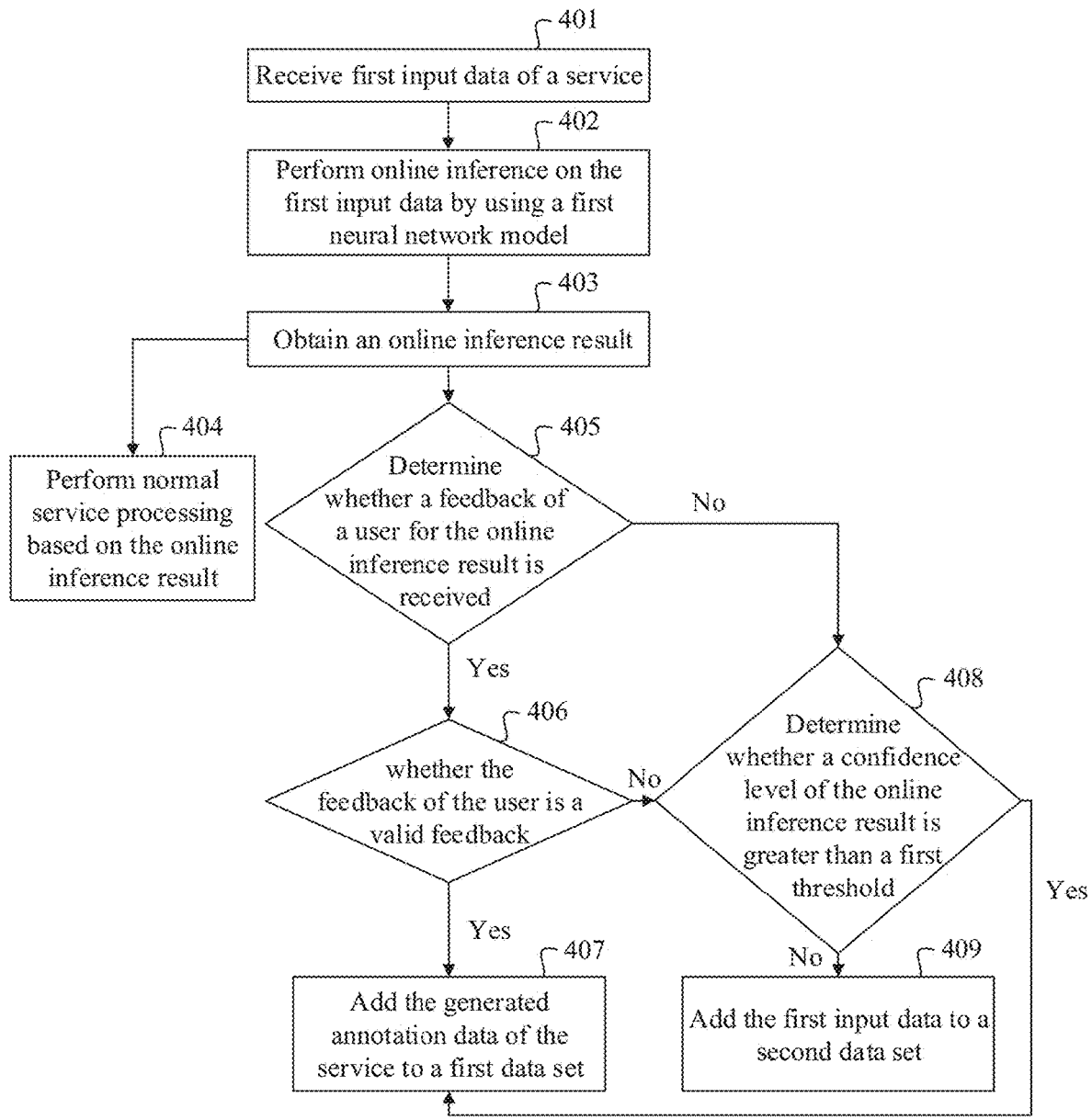
FIG. 4 is a schematic flowchart of generating annotation data according to an embodiment of this application.
Figure 5:
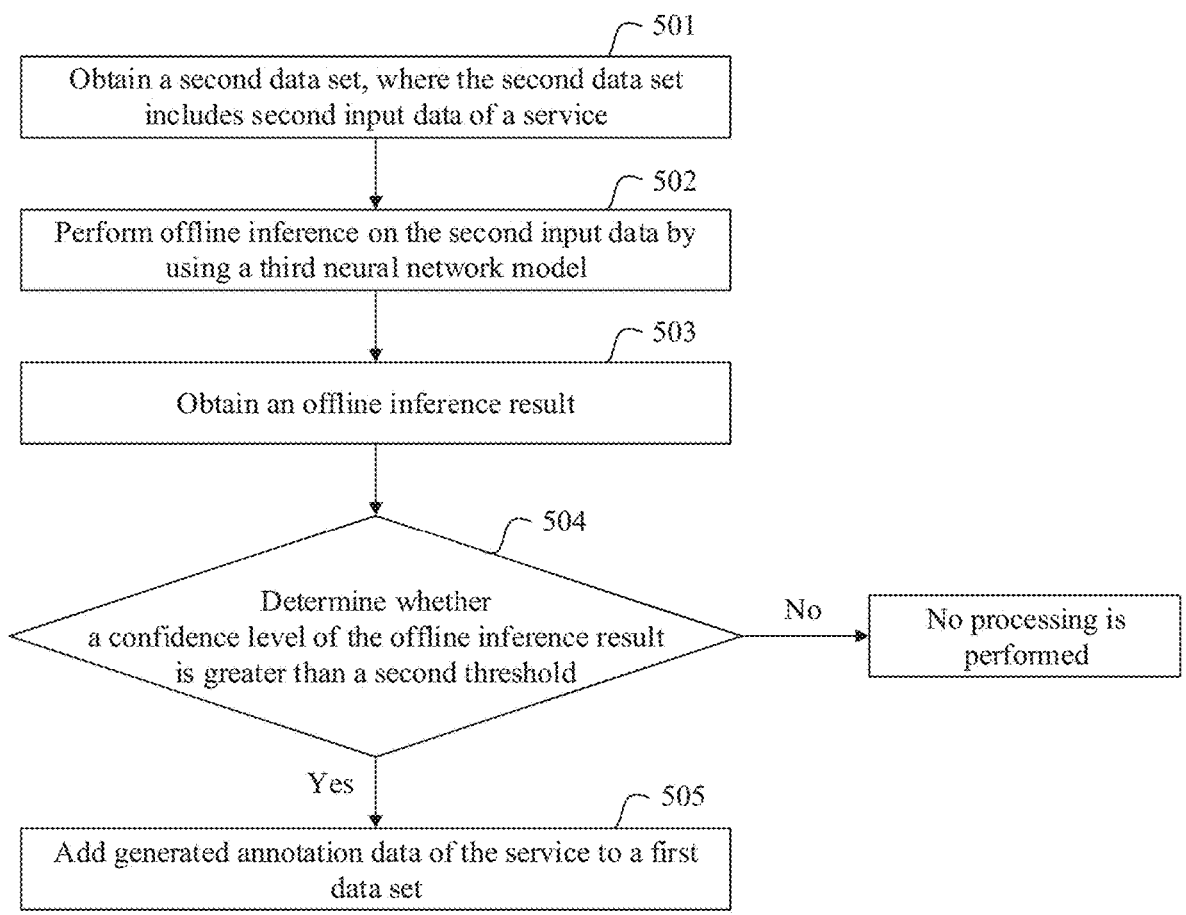
FIG. 5 is another schematic flowchart of generating annotation data according to an embodiment of this application.

With reference to FIG. 4 and FIG. 5, the following describes in detail a process of generating annotation data.

FIG. 4 is a schematic flowchart of generating annotation data according to an embodiment of this application. As shown in FIG. 4, the process includes the following steps.

Step 401: Receive first input data of a service.

Herein, if the service is an image recognition service, the first input data may be a to-be-recognized picture input by a user. In an example, the to-be-recognized picture is a picture of a cat.

Step 402: Perform online inference on the first input data by using a first neural network model.

Herein, specifically, the picture of the cat may be recognized.

Step 403: Obtain an online inference result. The online inference result includes a plurality of results, which are sorted based on recognition rates. For example, a recognition rate of the cat is 80%, a recognition rate of a dog is 16%, . . . , and a recognition rate of a person is 1%.

Step 404: Perform normal service processing based on the online inference result.

Step 405: Determine whether a feedback of the user for the online inference result is received, and perform step 406 if the feedback of the user for the online inference result is received, or perform step 408 if no feedback of the user for the online inference result is received.

Herein, the feedback of the user for the online inference result may refer to a change for the online inference result, or may be in another feedback form. This is not specifically limited.

Step 406: Determine whether the feedback of the user is a valid feedback; and if the feedback of the user is the valid feedback, generate annotation data of the service based on the first input data and the valid feedback of the user for the online inference result, and perform step 407; or if the feedback of the user is not the valid feedback, perform step 408.

A determining criterion of determining whether the feedback of the user is the valid feedback may be set based on an actual requirement. This is not specifically limited. For example, if the user renames the online inference result of the to-be-recognized picture as "owl", it may be considered that the feedback of the user for the online inference result is received and is the valid feedback, and the "owl" is used as a valid label of the to-be-recognized picture. Then, the to-be-recognized picture and the "owl" form a group of annotation data.

Step 407: Add the generated annotation data of the service to a first data set.

The first data set may include one or more groups of annotation data generated in a specified period.

In this embodiment of this application, to ensure data security, the annotation data may be encrypted and then added to the first data set.

Step 408: Determine whether a confidence level of the online inference result is greater than a first threshold; and if the confidence level of the online inference result is greater than the first threshold, generate annotation data of the service based on the first input data and the online inference result, and perform step 407; or if the confidence level of the online inference result is not greater than the first threshold, perform step 409.

Herein, the determining whether a confidence level of the online inference result is greater than a first threshold is specifically determining whether a top 1 recognition rate is greater than the first threshold. Referring to the foregoing example, the top 1 recognition rate may be specifically the recognition rate of the "cat", namely, 80%. If the first threshold is set to 79%, because the recognition rate of the "cat" is greater than the first threshold, the "cat" may be used as a valid label of the to-be-recognized picture, and then the to-be-recognized picture and the "cat" form a group of annotation data. If the first threshold is set to 85%, because the recognition rate of the "cat" is less than the first threshold, no valid label of the to-be-recognized picture is obtained. In this case, the to-be-recognized picture is non-annotation data.

Step 409: Add the first input data to a second data set. Herein, to ensure data security, the first input data may be encrypted and then added to the second data set. The second data set may include one or more groups of non-annotation data.

It can be learned from the foregoing content that, the process shown in FIG. 4 specifically describes a case in which the annotation data and the non-annotation data of the service are obtained by combining online inference and reinforcement learning.

FIG. 5 is another schematic flowchart of generating annotation data according to an embodiment of this application. As shown in FIG. 5, the process includes the following steps.

Step 501: Obtain a second data set, where the second data set includes second input data of a service. Herein, the second input data may be the non-annotation data obtained in the foregoing manner, or may be non-annotation data that is input by a user and on which online inference does not need to be performed.

Step 502: Perform offline inference on the second input data by using a third neural network model.

Herein, precision of a parameter value of a third neural network is greater than precision of a parameter value of a second neural network, or a third neural network is a second neural network. In other words, with reference to the description in the foregoing system architecture, the neural network model $S_i$ may be used to perform offline inference on the second input data, or the neural network model $S_c$ may be used to perform offline inference on the second input data.

Step 503: Obtain an offline inference result. The offline inference result includes a plurality of results, which are sorted based on recognition rates. For example, a recognition rate of a cat is 80%, a recognition rate of a dog is 16%, . . . , and a recognition rate of a person is 1%.

Step 504: Determine whether a confidence level of the oline inference result is greater than a second threshold; and if the confidence level of the offline inference result is greater than the second threshold, generate annotation data of the service based on the second input data and the offline inference result, and perform step 505; or if the confidence level of the offline inference result is not greater than the second threshold, end the process, and skipping further processing the data.

Herein, the determining whether a confidence level of the offline inference result is greater than a second threshold may be specifically determining whether a top 1 recognition rate is greater than the second threshold. Referring to the foregoing example, the top 1 recognition rate may be specifically the recognition rate of the "cat", namely, 80%. If the second threshold is set to 79%, because the recognition rate of the "cat" is greater than the second threshold, the "cat" may be used as a valid label of a to-be-recognized picture, and then the to-be-recognized picture and the "cat" form a group of annotation data of the service. If the second threshold is set to 85%, because the recognition rate of the "cat" is less than the second threshold, no valid label of a to-be-recognized picture is obtained. In this case, the to-be-recognized picture is non-annotation data.

Step 505: Add the generated annotation data of the service to a first data set. For details of this step, refer to step 407. Details are not described again.

It can be learned from the foregoing content that, the process shown in FIG. 5 specifically describes a case in which the annotation data of the service is obtained through the offline inference. In this embodiment of this application, the foregoing steps may be cyclically performed to perform offline inference on data in the second data set, to obtain the annotation data.

In this way, the annotation data that is of the service and that is generated in the specified period may be directly obtained from the first data set in step 301, the second neural network model is trained in step 302, and then the first neural network model is updated in step 303. Further, after the trained second neural network model is obtained and before the first neural network model is updated, the method further includes: if it is determined that the trained second neural network model is an initial update of a current version, storing the first neural network model, to compare the stored first neural network model with an upgrade version subsequently sent by a cloud server.

Figure 6:
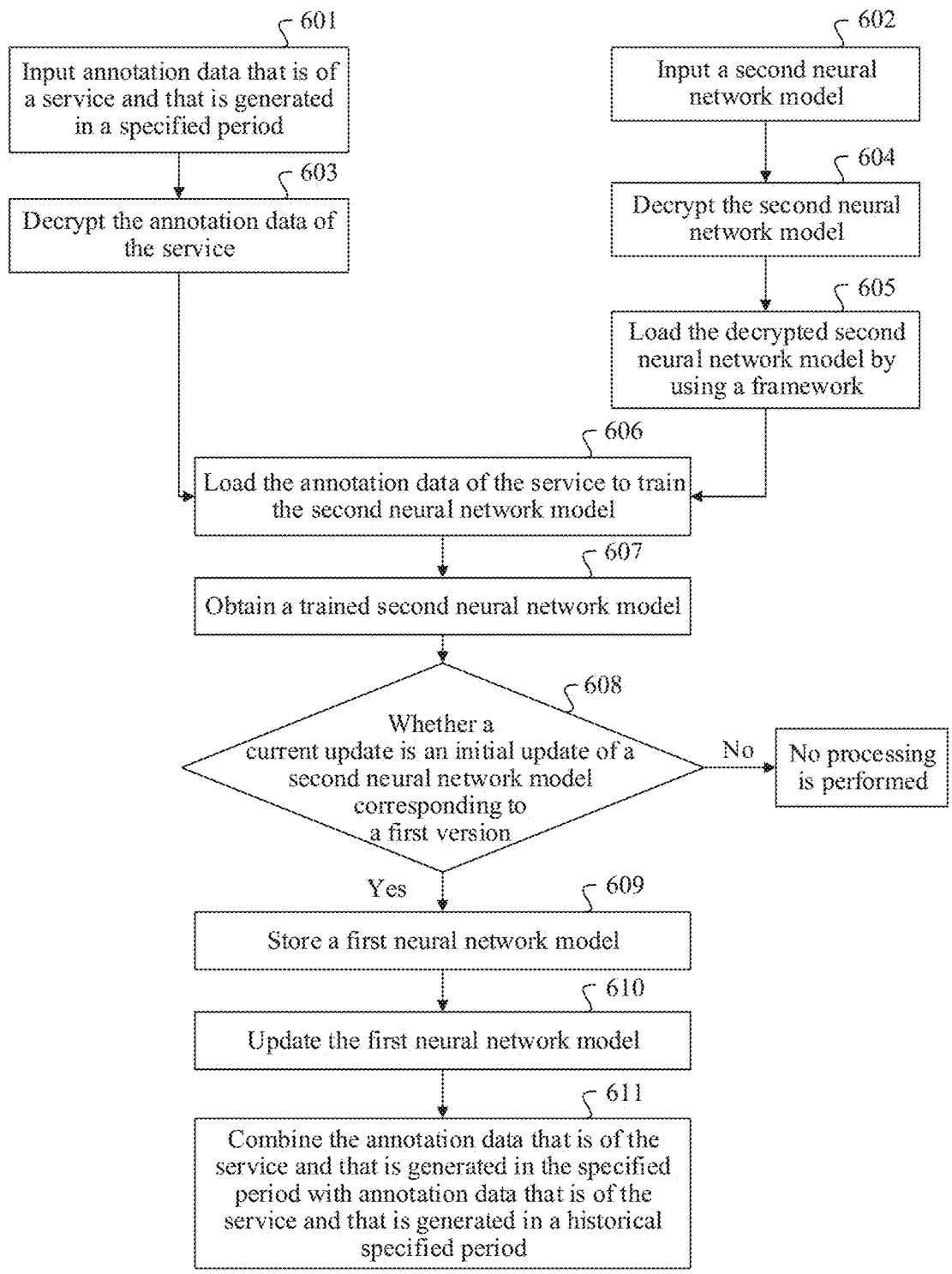
FIG. 6 is a schematic diagram of a process of training a neural network model according to an embodiment of this application.

With reference to FIG. 6, the following further describes a process of training a neural network model. As shown in FIG. 6, the process includes the following steps.

Step 601: Input annotation data that is of a service and that is generated in a specified period.

Step 602: Input a second neural network model.

Step 603: Decrypt the annotation data of the service.

Step 604: Decrypt the second neural network model.

Step 605: Load the decrypted second neural network model by using a framework (or a framework such as Tensorflow/Mxnet/Caffe of a neural network may be selected), including a network structure and a parameter value.

Step 606: Load the annotation data of the service to train the second neural network model.

Step 607: Obtain a trained second neural network model (a corresponding parameter value is updated).

Step 608: Determine whether a current update is an initial update of a second neural network model corresponding to a first version. If the current update is the initial update of the second neural network model corresponding to the first version, step 609 is performed. If the current update is not the initial update of the second neural network model corresponding to the first version, no processing is performed. Herein, the first version may be a version currently stored by a terminal device.

Step 609: Store a first neural network model, which is mainly used in comparison with a first neural network model of a new version (a second version) during next-time version upgrading (referring to content in FIG. 7).

Step 610: Update the first neural network model. Specifically, a first neural network model suitable to be used on the terminal device may be generated by converting the trained second neural network model by using an offline model conversion tool.

Step 611: Combine the annotation data (namely, annotation data in a first data set) that is of the service and that is generated in the specified period with annotation data that is of the service and that is generated in a historical specified period.

Herein, the terminal device may include an annotation data set. After step 601 to step 610 are completed in each specified period, annotation data in a current specified period may be combined into the annotation data set. In this way, the annotation data set may include annotation data that is of the service and that is generated in an initial specified period to the current specified period. For example, after step 601 to step 610 are completed in a specified period 3, annotation data in the specified period 3 may be combined into the annotation data set. In this case, the annotation data set includes annotation data in a specified period 1, a specified period 2, and the specified period 3.

It should be noted that step numbers shown in FIG. 6 are merely an example for description of an execution process, and constitute no limitation on an execution sequence of the steps. For example, step 601 and step 602 may be simultaneously performed, and step 603 and step 604 may be simultaneously performed.

In this embodiment of this application, after the first neural network model is upgraded, the process further includes the following: A second version software package sent by a cloud server is received, and the second version software package includes the first neural network model corresponding to the second version; and if it is determined that the first neural network model corresponding to the second version is different from the stored first neural network model, because the second version is an upgrade version, and usually has better performance than the first version, the first neural network model corresponding to the second version may be updated, and online inference is subsequently performed by using an updated first neural network model corresponding to the second version; or if it is determined that the first neural network model corresponding to the second version is the same as the stored first neural network model, online inference may continue to be performed by using the first neural network model obtained through update in step 303. Herein, the second version may be an upgrade version that is of the first version and that is generated by the cloud server.

Specifically, that the first neural network model corresponding to the second version is updated may be specifically: obtaining annotation data that is of the service and that is generated in a plurality of historical specified periods, training, by using the annotation data that is of the service and that is generated in the plurality of historical specified periods, a second neural network model corresponding to the second version, to obtain a trained second neural network model corresponding to the second version; and updating, based on the trained second neural network model corresponding to the second version, the first neural network model corresponding to the second version.

Herein, a difference between a manner of updating the first neural network model corresponding to the second version and a manner of updating the first neural network model corresponding to the first version lies in that different training data is used when the second neural network model is trained. Because a second neural network model corresponding to a new version is trained in the previous manner, training data used in the previous manner may be the annotation data that is of the service and that is generated in the plurality of specified periods (for example, all data in the annotation data set may be used). A data amount of the used training data is relatively large. Therefore, training can be more sufficient, and the trained second neural network model can better meet a personalized requirement of a user. The latter manner is a process of continuously updating the current version. Therefore, training data used in the latter manner is annotation data that is of the service and that is generated in one specified period, so that the second neural network model corresponding to the current version can gradually meet a personalized requirement of a user. For content other than the foregoing difference, mutual reference may be made to the two manners. Details are not described herein.

Figure 7:
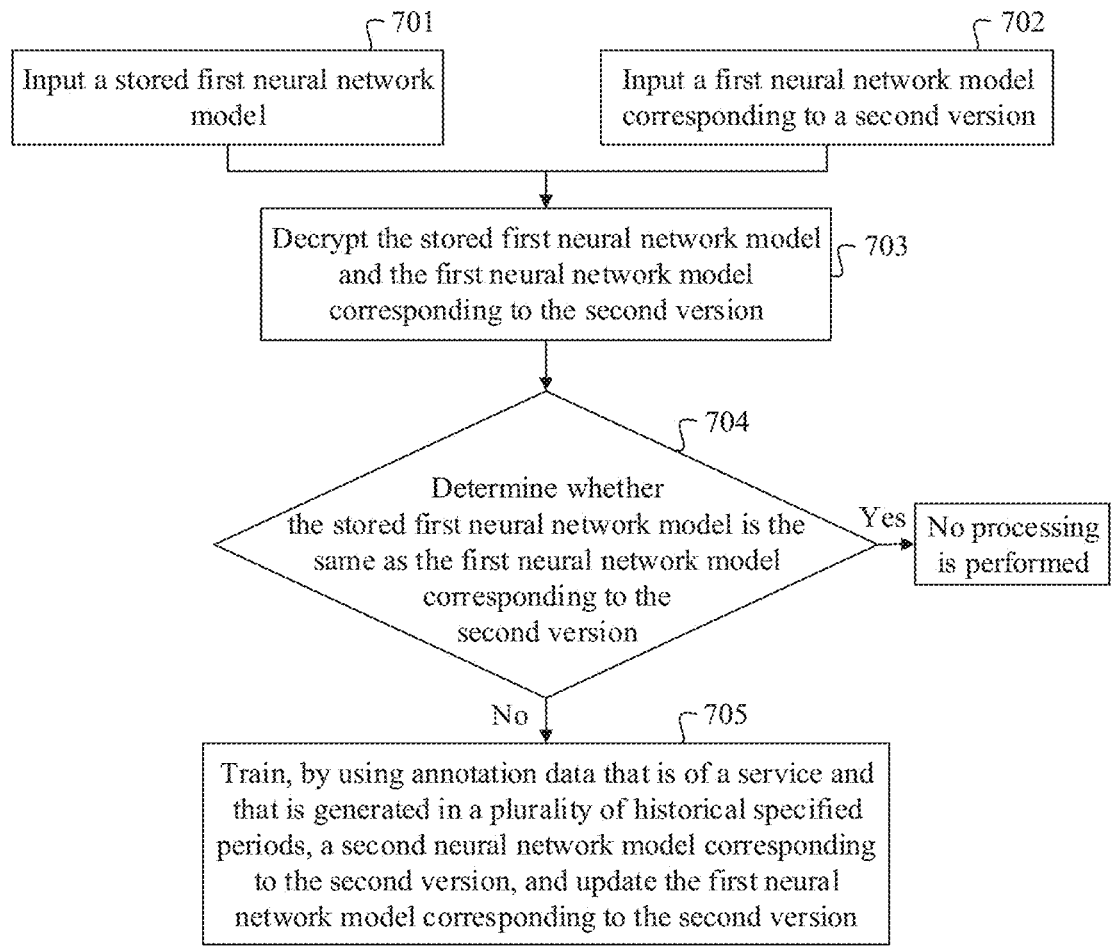
FIG. 7 is a schematic diagram of a processing procedure of a new version according to an embodiment of this application.

FIG. 7 is a schematic diagram of a processing procedure of a received new version. The following provides a detailed description with reference to FIG. 7. As shown in FIG. 7, the processing procedure includes the following steps.

Step 701: Input a stored first neural network model.

Step 702: Input a first neural network model corresponding to a second version.

Step 703: Decrypt the stored first neural network model and the first neural network model corresponding to the second version.

Step 704: Determine, through comparison, whether the stored first neural network model is the same as the first neural network model corresponding to the second version. If the stored first neural network model is the same as the first neural network model corresponding to the second version, no additional processing needs to be performed, and online inference continues to be performed by using the first neural network model obtained through update in step 303. If the stored first neural network model is not the same as the first neural network model corresponding to the second version, step 705 is performed.

Herein, when whether the stored first neural network model is the same as the first neural network model corresponding to the second version is determined through comparison, whether network structures of the stored first neural network model and the first neural network model corresponding to the second version are the same and whether corresponding parameter values are the same need to be determined through comparison. Only when both the network structures and the corresponding parameter values are completely the same, it can be considered that the stored first neural network model is the same as the first neural network model corresponding to the second version. In specific implementation, a hash method may be used for comparison. Details are not described herein.

Step 705: Train, by using annotation data that is of a service and that is generated in a plurality of historical specified periods, a second neural network model corresponding to the second version, to obtain a trained second neural network model corresponding to the second version; and update, based on the trained second neural network model corresponding to the second version, the first neural network model corresponding to the second version, and subsequently perform online inference by using an updated first neural network model corresponding to the second version.

It can be learned from the foregoing content that, in this embodiment of this application, after the new version is received, a first neural network model corresponding to the new version is compared with a first neural network model corresponding to a current version, to determine whether to use the new version. Therefore, a quantity of upgrade times can be effectively reduced, processing load can be reduced, and it can be ensured that the model meets a personalized requirement of a user.

For the foregoing method procedure, an embodiment of this application further provides a terminal device. For a specific implementation of the terminal device, refer to the description of the foregoing method.

Figure 8:
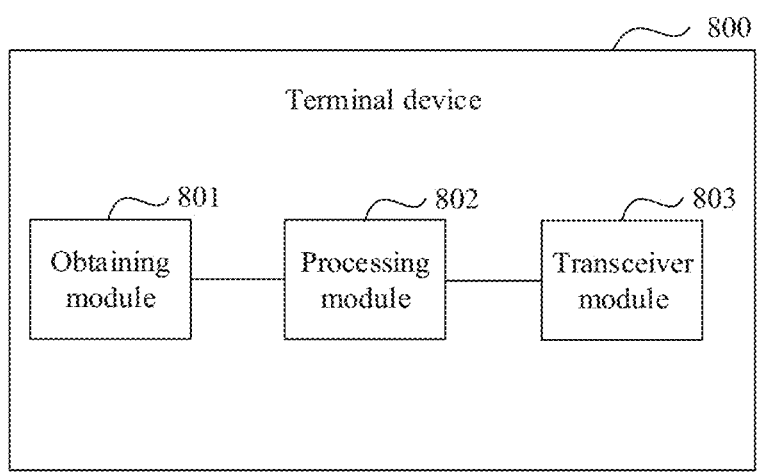
FIG. 8 is a schematic structural diagram of a terminal device according to an embodiment of this application.

Based on a same inventive concept, FIG. 8 is a schematic structural diagram of a terminal device according to an embodiment of this application. The terminal device includes a first neural network model and a second neural network model that are used to process a service. Precision of the first neural network model is lower than precision of the second neural network model. The terminal device is configured to implement the procedures shown in FIG. 3 to FIG. 7. As shown in FIG. 8, the terminal device 800 includes:

an obtaining module 801, configured to obtain annotation data that is of the service and that is generated by the terminal device in a specified period; and a processing module 802, configured to: train the second neural network model by using the annotation data that is of the service and that is generated in the specified period, to obtain a trained second neural network model; and update the first neural network model based on the trained second neural network model.

In a possible design, after obtaining the trained second neural network model and before updating the first neural network model, the processing module 802 is further configured to:

if it is determined that the trained second neural network model is an initial update of a second neural network model corresponding to a first version, store the first neural network model.

The terminal device further includes a transceiver module 803, and the transceiver module 803 is configured to receive a second version software package sent by a cloud server. The second version software package includes a first neural network model corresponding to a second version.

The processing module 802 is further configured to: if it is determined that the first neural network model corresponding to the second version is different from the stored first neural network model, update the first neural network model corresponding to the second version.

In a possible design, the processing module 802 is specifically configured to:

obtain annotation data that is of the service and that is generated in a plurality of historical specified periods;

train, by using the annotation data that is of the service and that is generated in the plurality of historical specified periods, a second neural network model corresponding to the second version, to obtain a trained second neural network model corresponding to the second version; and update, based on the trained second neural network model corresponding to the second version, the first neural network model corresponding to the second version.

In a possible design, the processing module 802 is further configured to: perform online inference on first input data of the service in the specified period by using the first neural network model, to obtain an online inference result; and if the transceiver module 803 receives a valid feedback of a user for the online inference result, generate the annotation data of the service based on the first input data and the valid feedback of the user for the online inference result; or if the transceiver module 803 receives no valid feedback of a user for the online inference result, after it is determined that a confidence level of the online inference result is greater than a first threshold, generate the annotation data of the service based on the first input data and the online inference result.

In a possible design, the processing module 802 is further configured to:

perform offline inference on second input data of the service in the specified period by using a third neural network model, to obtain an offline inference result, where precision of the third neural network model is higher than the precision of the second neural network model, or the third neural network model is the second neural network model; and if it is determined that a confidence level of the offline inference result is greater than a second threshold, generate the annotation data of the service based on the second input data and the offline inference result.

In a possible design, the processing module 802 is specifically configured to:

when the terminal device is in a charging state, train the second neural network model by using the annotation data that is of the service and that is generated in the specified period.

It should be noted that module division in the embodiments of this application is an example, and is merely logical function division. There may be another division manner in actual implementation. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of the software function module and sold or used as an independent product, the integrated module may be stored in a computer-readable storage medium. Based on such understanding, the technical solutions of this application essentially, or a part contributing to the prior art, or all or some of the technical solutions may be implemented in a form of a software product. The computer software product is stored in a storage medium, and includes instructions for instructing a computer device (which may be a personal computer, a server, a network device, or the like) or a processor to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

Figure 9:
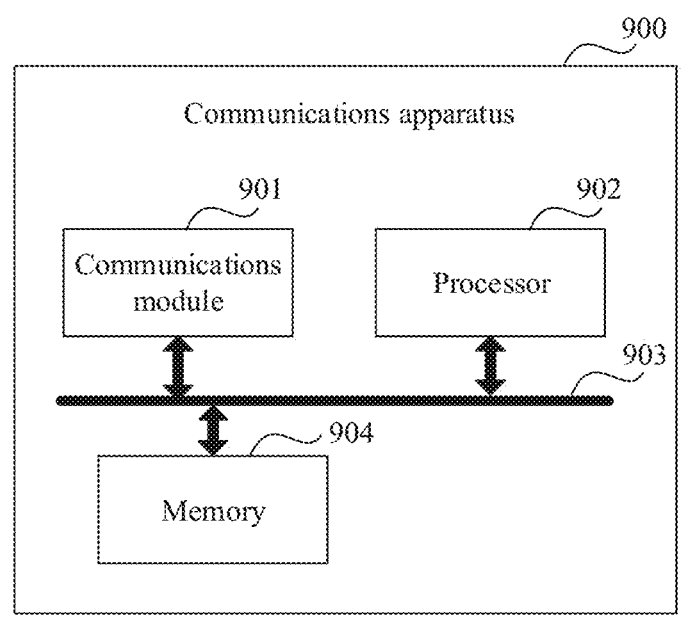
FIG. 9 is a schematic structural diagram of a communications apparatus according to an embodiment of this application.

Based on the foregoing embodiments, an embodiment of this application further provides a communications apparatus. The communications apparatus includes a first neural network model and a second neural network model that are used to process a service. Precision of the first neural network model is lower than precision of the second neural network model. The communications apparatus may be a terminal device, and is configured to implement the procedures or steps in the method embodiments shown in FIG. 3 to FIG. 7. The communications apparatus has a function of the terminal device 800 shown in FIG. 8. As shown in FIG. 9, the communications apparatus 900 includes a communications module 901 and a processor 902.

The communications module 901 is configured to communicate and interact with another device.

The communications module 901 may be an RF circuit, a Wi-Fi module, a communications interface, a Bluetooth module, or the like.

The processor 902 is configured to implement a function of the processing module in FIG. 8.

Optionally, the communications apparatus 900 may further include a memory 904, configured to store a program and the like. Specifically, the program may include program code, and the program code includes an instruction. The memory 904 may include a RAM, and may further include a non-volatile memory, for example, at least one magnetic disk memory. The processor 902 executes the application program stored in the memory 904, to implement the foregoing functions.

In a possible manner, the communications module 901, the processor 902, and the memory 904 are connected to each other and communicate with each other. For example, the communications module 901, the processor 902, and the memory 904 may be connected to each other through a bus 903. The bus 903 may be a PCI bus, an EISA bus, or the like. The bus may be classified into an address bus, a data bus, a control bus, and the like. For ease of indication, the bus is indicated by using only one bold line in FIG. 9. However, this does not indicate that there is only one bus or only one type of bus.

An embodiment of this application further provides a chip. The chip is connected to a memory, the memory stores a computer program, and the chip is configured to read and execute the computer program stored in the memory, to implement the procedures shown in FIG. 3 to FIG. 7.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that, a person skilled in the art may make various modifications and variations to the embodiments of the present invention without departing from the spirit and scope of this application. In this way, this application is intended to cover these modifications and variations provided that they fall within the scope of protection defined by the following claims and their equivalent technologies.

What is claimed is:

1. A method for training a neural network model, comprising:
obtaining, by a terminal device, annotation data of a service generated by the terminal device in, wherein the service is to be processed by a first neural network model based on performing online inference and a second neural network model based on performing offline inference, and wherein precision of the first neural network model is lower than precision of the second neural network model;
training, by the terminal device, the second neural network model by using the annotation data to obtain a trained second neural network model; and
updating, by the terminal device, the first neural network model based on the trained second neural network model.

2. The method according to claim 1, wherein the method further comprises:
before updating the first neural network model and in response to determining that the trained second neural network model is an initial update of a second neural network model corresponding to a first version, storing, by the terminal device, the first neural network model;
after updating the first neural network model, receiving, by the terminal device, a second version software package sent by a cloud server, wherein the second version software package comprises a first neural network model corresponding to a second version; and in response to determining that the first neural network model corresponding to the second version is different from the stored first neural network model, updating, by the terminal device, the first neural network model corresponding to the second version.

3. The method according to claim 2, wherein updating the first neural network model corresponding to the second version comprises:
obtaining, by the terminal device, annotation data of the service generated in a plurality of historical preset periods;
training, by the terminal device by using the annotation data of the service generated in the plurality of historical preset periods, a second neural network model corresponding to the second version, to obtain a trained second neural network model corresponding to the second version; and
updating, by the terminal device based on the trained second neural network model corresponding to the second version, the first neural network model corresponding to the second version.

4. The method according to claim 1, wherein the terminal device generates the annotation data of the service based on:
performing the online inference on first input data of the service by using the first neural network model, to obtain an online inference result, wherein
if a valid feedback of a user for the online inference result is received, generating, by the terminal device, the annotation data of the service based on the first input data and the valid feedback of the user for the online inference result; or
if no valid feedback of a user for the online inference result is received, generating, by the terminal device, the annotation data of the service based on the first input data and the online inference result after determining that a confidence level of the online inference result is greater than a first threshold.

5. The method according to claim 1, wherein the terminal device generates the annotation data of the service based on:
performing the offline inference on second input data of the service by using a third neural network model, to obtain an offline inference result, wherein precision of the third neural network model is higher than the precision of the second neural network model, or the third neural network model is the second neural network model; and
in response to determining that a confidence level of the offline inference result is greater than a second threshold, generating, by the terminal device, the annotation data of the service based on the second input data and the offline inference result.

6. The method according to claim 1, wherein training the second neural network model by using the annotation data comprises:
training the second neural network model when the terminal device is in a charging state.

7. A terminal device, comprising:
a memory storing instructions; and
one or more processors in communication with the memory for executing the instructions to:
obtain annotation data of a service generated by the terminal device in, wherein the service is to be processed by a first neural network model based on performing online inference and a second neural network model based on performing offline inference, and wherein precision of the first neural network model is lower than precision of the second neural network model;
train the second neural network model by using the annotation data to obtain a trained second neural network model; and
update the first neural network model based on the trained second neural network model.

8. The terminal device according to claim 7, wherein the one or more processors are for executing the instructions to:
before updating the first neural network model and in response to determining that the trained second neural network model is an initial update of a second neural network model corresponding to a first version, store the first neural network model;
receive a second version software package sent by a cloud server, and the second version software package comprises a first neural network model corresponding to a second version; and
in response to determining that the first neural network model corresponding to the second version is different from the stored first neural network model, update, by the terminal device, the first neural network model corresponding to the second version.

9. The terminal device according to claim 8, wherein the one or more processors are for executing the instructions to:
obtain annotation data that is of the service and that is generated in a plurality of historical preset periods;
train, by using the annotation data that is of the service and that is generated in the plurality of historical preset periods, a second neural network model corresponding to the second version, to obtain a trained second neural network model corresponding to the second version; and update, based on the trained second neural network model corresponding to the second version, the first neural network model corresponding to the second version.

10. The terminal device according to claim 7, wherein the one or more processors are for executing the instructions to:
perform the online inference on first input data of the service by using the first neural network model, to obtain an online inference result, wherein
if a valid feedback of a user for the online inference result is received, generate the annotation data of the service based on the first input data and the valid feedback of the user for the online inference result; or
if no valid feedback of a user for the online inference result is received, generate the annotation data of the service based on the first input data and the online inference result after determining that a confidence level of the online inference result is greater than a first threshold.

11. The terminal device according to claim 7, wherein the one or more processors are for executing the instructions to:
perform the offline inference on second input data of the service by using a third neural network model, to obtain an offline inference result, wherein precision of the third neural network model is higher than the precision of the second neural network model, or the third neural network model is the second neural network model; and
in response to determining that a confidence level of the offline inference result is greater than a second threshold, generate the annotation data of the service based on the second input data and the offline inference result.

12. The terminal device according to claim 7, wherein the one or more processors are for executing the instructions to:
train the second neural network model when the terminal device is in a charging state.

13. A non-transitory computer-readable medium storing computer instructions executable by one or more processors of a terminal device to:
obtain annotation data of a service generated by the terminal device in, wherein the service is to be processed by a first neural network model based on performing online inference and a second neural network model based on performing offline inference, and wherein precision of the first neural network model is lower than precision of the second neural network model;
train the second neural network model by using the annotation data to obtain a trained second neural network model; and
update the first neural network model based on the trained second neural network model.

14. The non-transitory computer-readable medium according to claim 13, the computer instructions are executable by the one or more processors to:
before updating the first neural network model and in response to determining that the trained second neural network model is an initial update of a second neural network model corresponding to a first version, store the first neural network model;

receive a second version software package sent by a cloud server, wherein the second version software package comprises a first neural network model corresponding to a second version; and
in response to determining that the first neural network model corresponding to the second version is different from the stored first neural network model, update the first neural network model corresponding to the second version.

15. The non-transitory computer-readable medium according to claim 14, wherein the updating the first neural network model corresponding to the second version comprises:
obtaining annotation data that is of the service and that is generated in a plurality of historical preset periods;
training, by using the annotation data that is of the service and that is generated in the plurality of historical preset periods, a second neural network model corresponding to the second version, to obtain a trained second neural network model corresponding to the second version; and
updating, based on the trained second neural network model corresponding to the second version, the first neural network model corresponding to the second version.

16. The non-transitory computer-readable medium according to claim 13, wherein the terminal device generates the annotation data of the service based on:
performing the online inference on first input data of the service by using the first neural network model, to obtain an online inference result, wherein
if a valid feedback of a user for the online inference result is received, generating the annotation data of the service based on the first input data and the valid feedback of the user for the online inference result; or
if no valid feedback of a user for the online inference result is received, generating the annotation data of the service based on the first input data and the online inference result after determining that a confidence level of the online inference result is greater than a first threshold.

17. The non-transitory computer-readable medium according to claim 13, wherein the terminal device generates the annotation data of the service based on:
performing the offline inference on second input data of the service by using a third neural network model, to obtain an offline inference result, wherein precision of the third neural network model is higher than the precision of the second neural network model, or the third neural network model is the second neural network model; and
in response to determining that a confidence level of the offline inference result is greater than a second threshold, generating the annotation data of the service based on the second input data and the offline inference result.

18. The non-transitory computer-readable medium according to claim 13, wherein training the second neural network model by using the annotation data comprises:
training the second neural network model when the terminal device is in a charging state.

* * * * *